United States Patent [19]

Itoh

[11] Patent Number: 4,513,325
[45] Date of Patent: Apr. 23, 1985

[54] IMAGE OUTPUTTING DEVICE
[75] Inventor: Satoru Itoh, Kanagawa, Japan
[73] Assignee: Fuji Xerox Co., Ltd., Tokyo, Japan
[21] Appl. No.: 357,124
[22] Filed: Mar. 11, 1982
[30] Foreign Application Priority Data Mar. 13, 1981 [JP] Japan ............................ 56-35402

[51] Int. Cl.³ ............................................. H04N 1/40
[52] U.S. Cl. ................................. 358/280; 358/265; 358/296
[58] Field of Search ............... 358/257, 288, 300, 265, 358/280, 296, 302

[56] References Cited
U.S. PATENT DOCUMENTS
2,450,649 10/1948 Finch .................................. 358/265

Primary Examiner—John C. Martin
Assistant Examiner—Edward L. Coles
Attorney, Agent, or Firm—Sughrue, Mion, Zinn, Macpeak and Seas

[57] ABSTRACT

An image outputting device includes a pattern generation for impressing a picture element reference pattern on a recorded document along with the picture information thereof, where the reference pattern is in phase with the recorded picture elements. When such a recorded document is used as an input original, the phase of each read out picture element is made coincident with that of the corresponding picture element on the original, to prevent deterioration of the image due to phase shifting.

8 Claims, 11 Drawing Figures

IMAGE OUTPUTTING DEVICE

BACKGROUND OF THE INVENTION

This invention relates to an image outputting device, and more particularly, to an image outputting device such as an OFT (Optical Fiber Tube) printer, or a laser beam printer in which a hard copy is obtained by utilizing digital image signals.

In the usual case, an output image has been regarded as acceptable if not subject to a significant fluctuation of lines, inclination of images or lack of uniformity in the pitch of scanning lines when visually observed. Thus, when such deviations are held to within about ½ to 1 interval between the picture elements, the output image has been considered to be satisfactory because such fine deviations are hard to detect by visual observation.

However, in the case where the image obtained by the prior image outputting device is newly employed as the input original for a reading device, there occurs a disadvantage in that image quality is significantly deteriorated due to a shift in phase between the picture element points of the image and the read-out picture element points.

SUMMARY OF THE INVENTION

It is an object of this invention to provide an image outputting device in which a reference figure indicating positions of output elements is output and recorded together with an image when the image is output, thus preventing the deterioration caused when using the output image from the image outputting device as an input original.

DETAILED DESCRIPTION OF THE PREFERRED EMBODIMENTS

Figure 1:
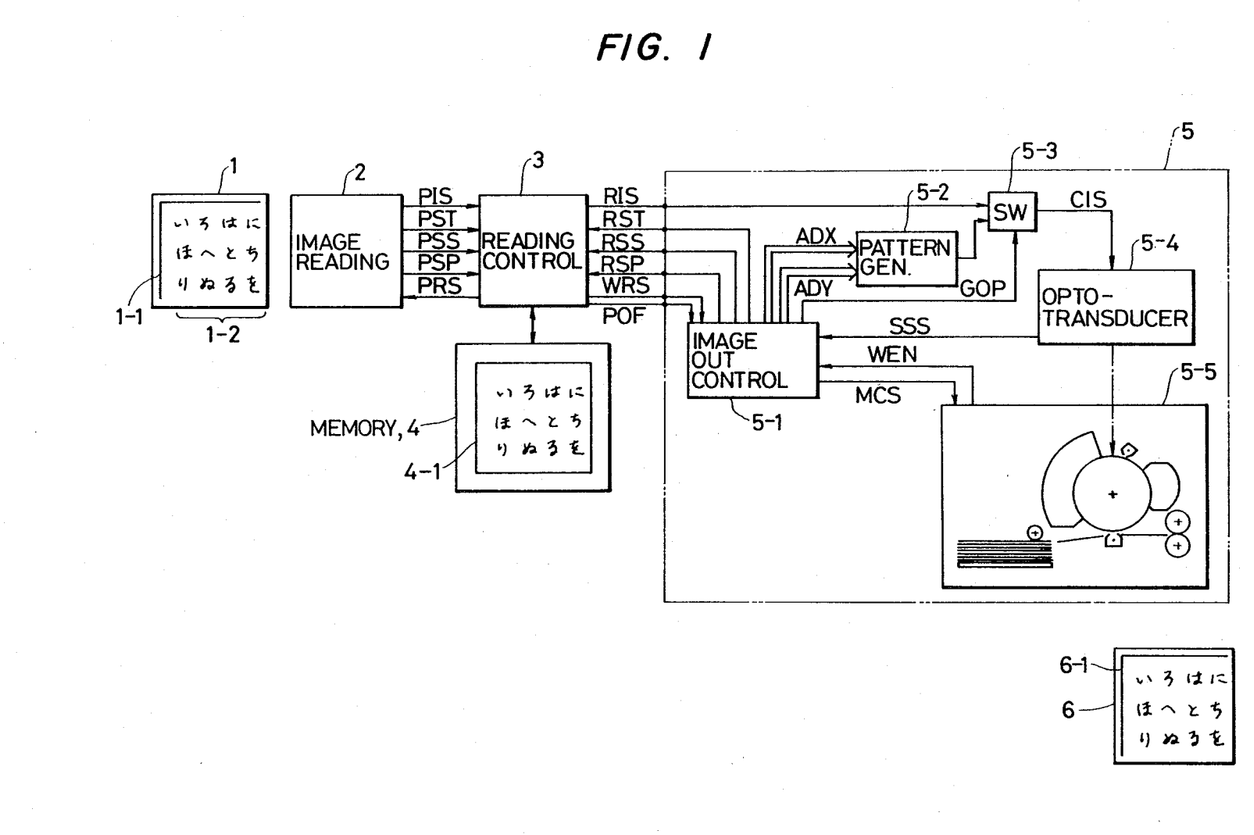
FIG. 1 is a block diagram according to one embodiment of the invention.

FIG. 1 shows a block diagram according to one embodiment of this invention. Referring to the drawings, designated at 1 is the input original, 2 is an image reading device, 3 is a reading control unit, 4 is a memory, 5 is an image outputting device, 5-1 is an output control unit, 5-2 is a pattern generation circuit, 5-3 is a switch, 5-4 is a optoelectric transducer, 5-5 is a xerography unit, and 6 is the reproduced image.

Figure 2:
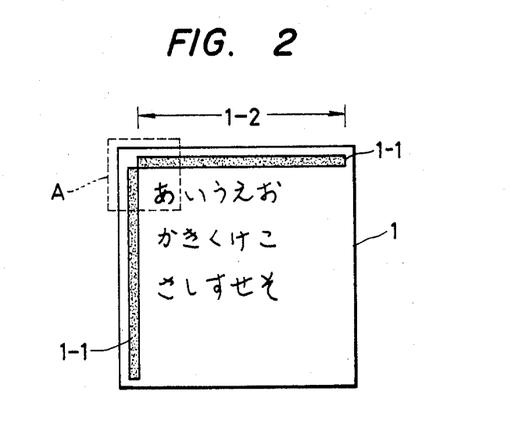
FIG. 2 is a schematic view of a reproduced image having a reference pattern.
Figure 3:
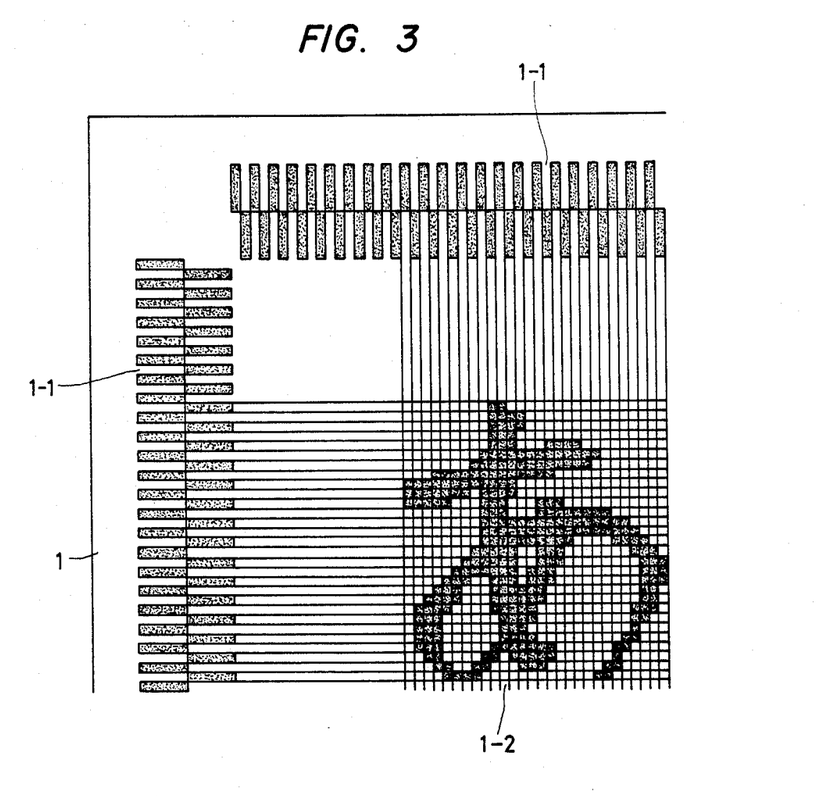
FIGS. 3 and 4 are partially enlarged views of the reproduced image showing typical examples of the reference pattern.

Moreover, let it be assumed in the drawing that the input original 1 has been obtained by the image outputting device according to this invention. As shown in FIGS. 2 and 3 in more detail, the input original 1 comprises an image section 1-2 and a picture element reference pattern 1-1.

The image reading device 2 starts its operation to read the input original 1 upon receiving a reading start signal RRS from the reading control unit 3. Having started its reading operation, the image reading device 2 scans the input original 1 from the left side to the right side and from the upper side to the lower side in sequence, and outputs a logical level "1" (a black level) or a logical level "0" (a white level).

On this occasion, prior to scanning the image section 1-2, the image reading device 2 carries out fine scanning at a scanning line density several times higher than normal, until the scanning reaches the picture element reference pattern 1-1. In this state, there generally exists no coincidence in phase relation between scanning apertures for conducting optoelectric conversion and recorded picture elements of the input original 1.

When the scanning reaches the picture element reference pattern 1-1, the image reading device 2 makes phases of both the scanning apertures for optoelectric conversion and the recorded picture elements coincide with each other, and now assumes a predetermined scanning pitch. A means for permitting the coincidence of both phases is disclosed in U.S. patent application Ser. No. 298,144 filed Aug. 31, 1981, now U.S. Pat. No. 4,408,232, corresponding to Japanese Patent Application No. 124049/80, and is thus not further described here.

The image reading device 2 outputs an image signal PIS, a strobe signal PSP indicating a significant point of the image signal (to determine the sampling timing), a start-of-scan signal PSS indicating the scanning start point, and a start-of-page signal PSP indicating the reading start point.

The above signals are respectively fed to the reading control unit 3, in which there are generated various signals for temporarily storing the image signal in the memory 4, except for the picture element reference pattern 1-1.

The input original 1 is stored in the memory 4 as a pattern comprising logical levels "1" and "0". More specifically, the image signal PIS from the image reading device 2 includes no signal for the picture element reference pattern 1-1, so that is can be represented as a stored image 4-1.

After all the information on the input original 1 is completely read out and stored, the reading control unit 3 outputs a write start signal WRS for actuating the image outputting device 5. Upon input of the write start signal WRS, the output control unit 5-1 outputs machine start signal MCS for actuating the xerography unit 5-5. When the xerography unit 5-5 starts its operation and the recording medium reaches a position where it is to be exposed, there issues a write enable signal WEN. With the thus issued signal, the output control unit 5-1 outputs the strobe signal RST, the start-of-scan signal RSS and the start-of-page signal RSP to the reading control unit 3 for reading out the image data 4-1 stored in the memory 4.

Upon input of those signals, the reading control unit 3 reads out the image data 4-1 stored in the memory 4 and then transfers the read-out image signal RIS to the gate 5-3 in the image outputting device 5 with the timing of the strobe signal RST.

Meanwhile, in addition to the foregoing respective signals fed to the reading control unit 3, the output control unit 5-1 outputs both an X-address signal ADX and a Y-address signal ADY synchronously with those signals to the pattern generation circuit 5-2, which in turn issues a predetermined picture element reference pattern signal.

The output control unit 5-1 also outputs a gate signal GOP to the gate 5-3 so as to mix (superimpose) the picture element reference pattern signal with (on) the read-out image signal RIS.

A combined image signal CIS output from the gate 5-3 is converted through the optoelectric transducer 5-4 into an optical pattern representing logical ones and zeros in accordance with a "1"/"0" pattern of the combined image signal.

The thus obtained optical pattern is scanned on a drum of the xerography unit 5-5 by utilizing well known prior techniques. As is generally known, the xerography device 5-5 develops an electrostatic latent image on the drum produced by the scanning of a light spot, and then outputs a reproduced image 6 after transferring and fixing the developed image on paper.

As will be apparent from the foregoing description, the reproduced image 6 obtained through the above stated processing includes a picture element reference pattern 6-1 recorded thereon, whose phase is in coincidence with that of each recorded picture element corresponding to the read-out image signal RIS.

Therefore, when the reproduced image 6 is employed as the input original, as mentioned above, the phase of each read-out picture element is made coincident with that of the corresponding picture element on the input original, thus enabling the prevention of deterioration in image quality due to a shift in phase between both picture elements.

In the case where the reproduced image 6 is not to be employed as the new input original, it is possible to output a pattern-off signal POF from the reading control unit 3 to the output control unit 5-1 by pressing a switch, and hence recording of the image reference pattern on the reproduced image 6 is stopped.

Figure 4:
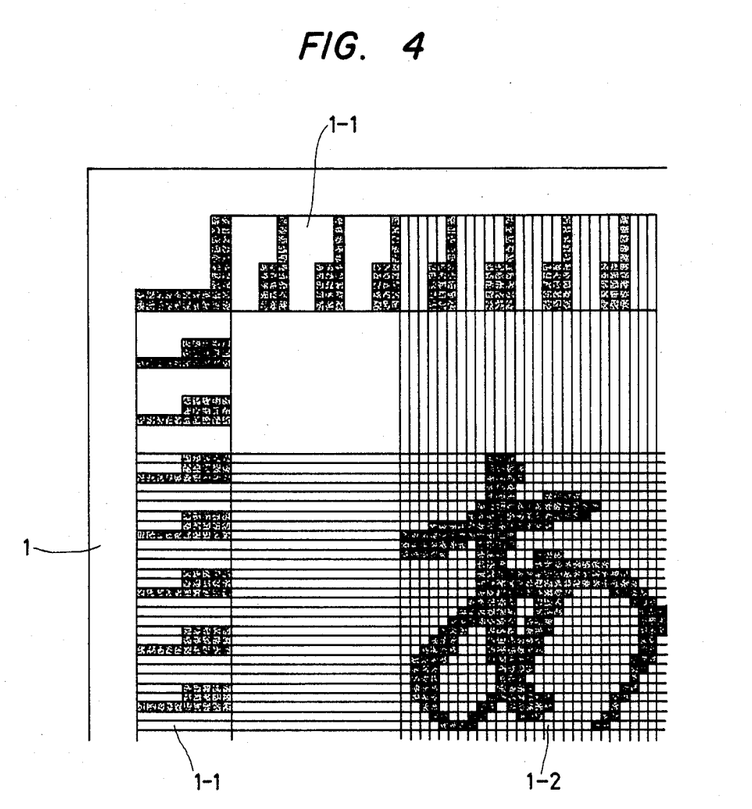

FIGS. 3 and 4 illustrate typical examples of the picture element reference pattern. These drawings are enlarged views of a part A of the original 1 as shown in FIG. 2.

In the picture element reference pattern of FIG. 3, "1"/"0" patterns made to have a phase in coincidence with the corresponding picture elements forming an image are arranged along both the main scanning and sub-scanning directions in the form of 2 bits repeated for each cycle.

In the picture element reference pattern of FIG. 4, "1"/"0" patterns similarly made to have a phase in coincidence with the corresponding picture elements forming an image are arranged along both the main scanning and sub-scanning directions in the form of 6 bits repeated for each cycle.

In addition to the above, the invention is also applicable to the case where the reproduced image is obtained by using a heat-sensitive recording head instead of the xerography unit 5-5.

Figure 5A:
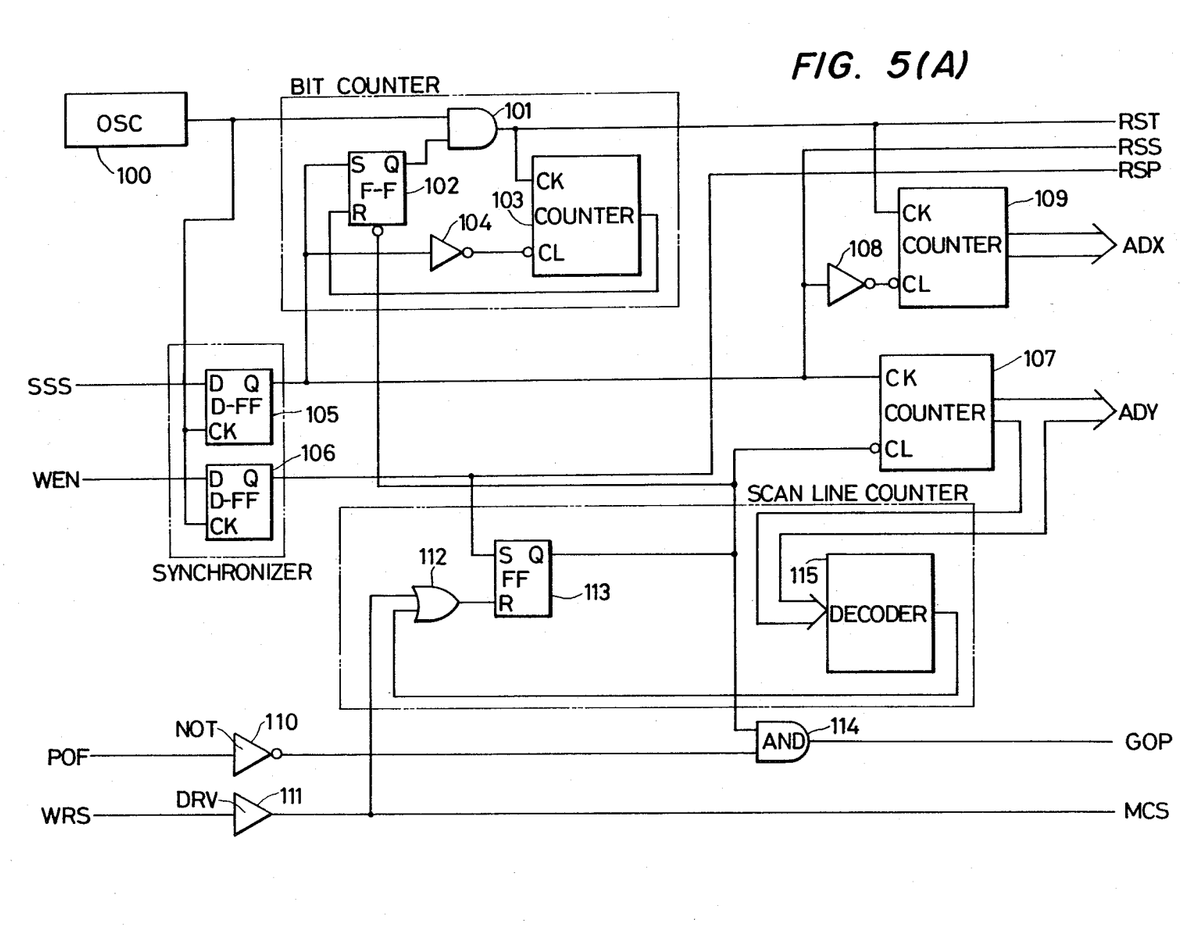
FIGS. 5A and 5B are a block diagram and a timing chart, respectively, illustrating the output control unit of FIG. 1.
Figure 5B:
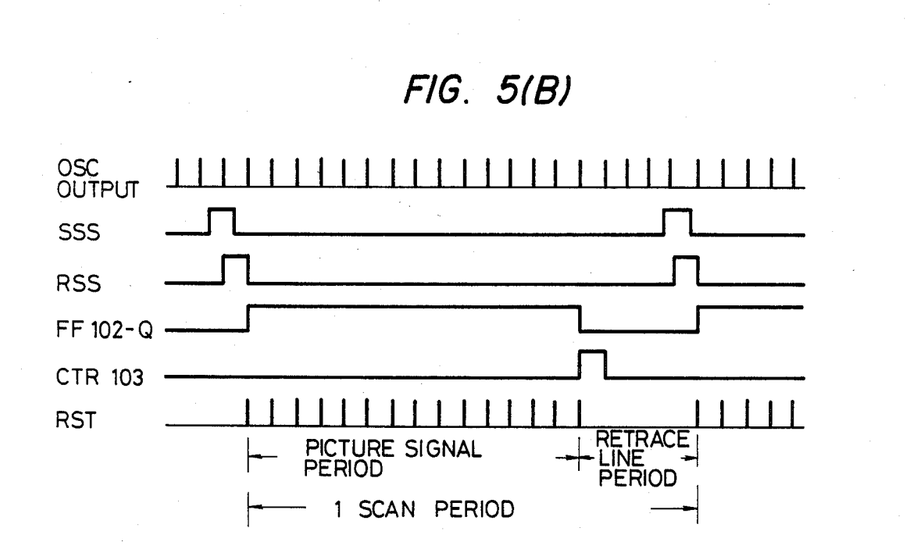

The output control unit 5-1 will now be described in more detail with reference to a block diagram and a timing chart shown in FIGS. 5A and 5B, respectively.

Upon receipt of the write start signal WRS from the reading control unit 3, the output control unit 5-1 outputs the machine start signal MCS through a driver 111 for actuating the xerograph unit 5-5. The WRS signal is also applied through an OR gate 112 to the reset input terminal of an R-S flip-flop 113 to reset the latter so that the Q output thereof is rendered low. In response thereto, an R-S flip-flop 102 and a counter 107 are cleared.

The write enable signal WEN produced from the xerography unit 5-5 is applied to the data terminal of a D-type flip-flop 106 which, together with another D-type flip-flop 105, constitutes a synchronizer. Upon receipt of the WEN signal, the flip-flop 106 produces from its Q output a start-of-page signal RSP in synchronization with the clock pulses delivered from an oscillator 100. The RSP signal is applied to the set input terminal of the flip-flop 113 to set the latter so that the Q output thereof is raised, thereby placing the flip-flop 102 and a counter 107 in operable condition. The Q output of the flip-flop 113 is further applied to one input terminal of an AND gate 114 which is thus enabled to produce the gate signal GOP provided that the pattern-off signal POF applied through a NOT gate 110 to another input terminal of the AND gate 114 is high.

A scanner start-of-scan signal SSS which is produced from the optoelectric transducer 5-4 at the beginning of each scanning is applied to the data terminal of the flip-flop 105 so that the latter produces from its Q output the start-of-scan signal RSS in synchronization with the clock pulses delivered from the oscillator 100. The RSS signal thus produced is applied to the set terminal of the flip-flop 102 to set the latter and is applied to the clear terminal of a counter 103 through a NOT gate 104 to clear it. The RSS signal is further applied through a NOT gate 108 to the clear terminal of a counter 109 to clear the latter. When the Q output of the flip-flop 113 is high, the counter 107 counts in response to the RSS signal applied to the clock terminal of the counter 107.

The clock pulses generated from the oscillator 100 are applied to one input terminal of an AND gate 101. The latter is enabled when the Q output of the flip-flop 102 is high, thereby producing the strobe signal RST. The RST signal thus produced is applied to the clock terminals of counters 103 and 109 to thereby effect counting. In response to the RST signal applied to the clock terminal of the counter 109, the latter produces the X-address signal ADX while the Y-address signal ADY is produced from the counter 107. The ADY signal is fed through a decoder 115 to the OR gate 112.

Figure 6A:
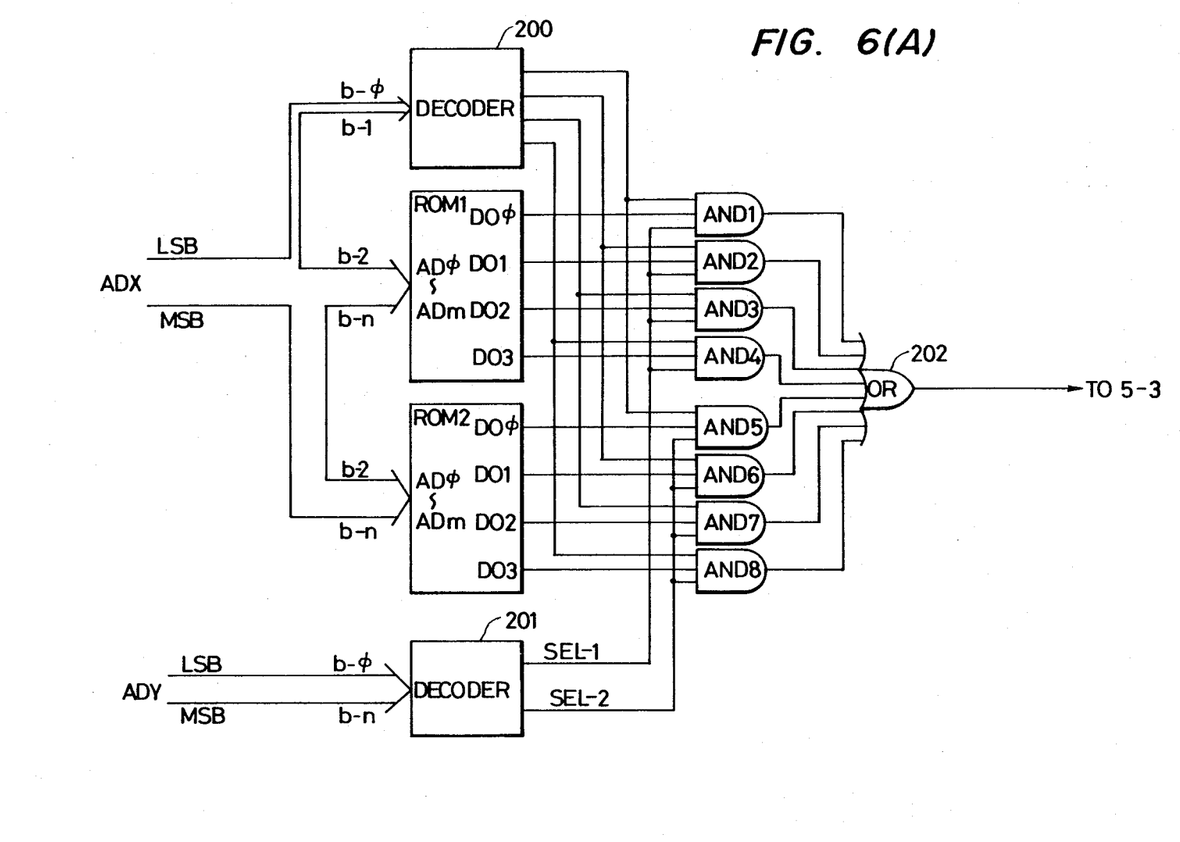
FIG. 6A is a block diagram illustrating the pattern generation circuit of FIG. 1.

The pattern generation circuit 5-2 will next be described in detail with reference to FIGS. 6A through 6E. FIG. 6A is a block diagram showing the pattern generation circuit 5-2 where read-only memories (ROMs) 1 and 2 (each 4-bit X m words) are provided. Necessary data are previously written in the ROMs 1 and 2 so that the patterns as shown in FIG. 6B are generated.

The ADX signal is an n-bit binary signal. In ROM 1, the patterns as shown in FIG. 6C are written from address 0 to address m at every four bits. It should be noted that, although in the above description, the ROMs provide 4-bit outputs, modifications are possible so that the ROMs provide, for example, 8-bit outputs or 1-bit outputs. In the case where the ROMs providing 8-bit outputs are employed, the input to a decoder 200 should be B0 to b2 and the input to the ROMs should be b3 to bn. In the case where ROMs providing 1-bit outputs are employed, all the bits from b0 to bn are applied to the ROMs.

The ADY signal is also an n-bit binary signal, all the bits of which are maintained at "0" until the WEN signal is inputted. The ADY signal is representative of the number of the scanning lines on one page. The ADY signal is applied to a decoder 201, from which signals SEL-1 and SEL-2 are outputted.

Figure 6B:
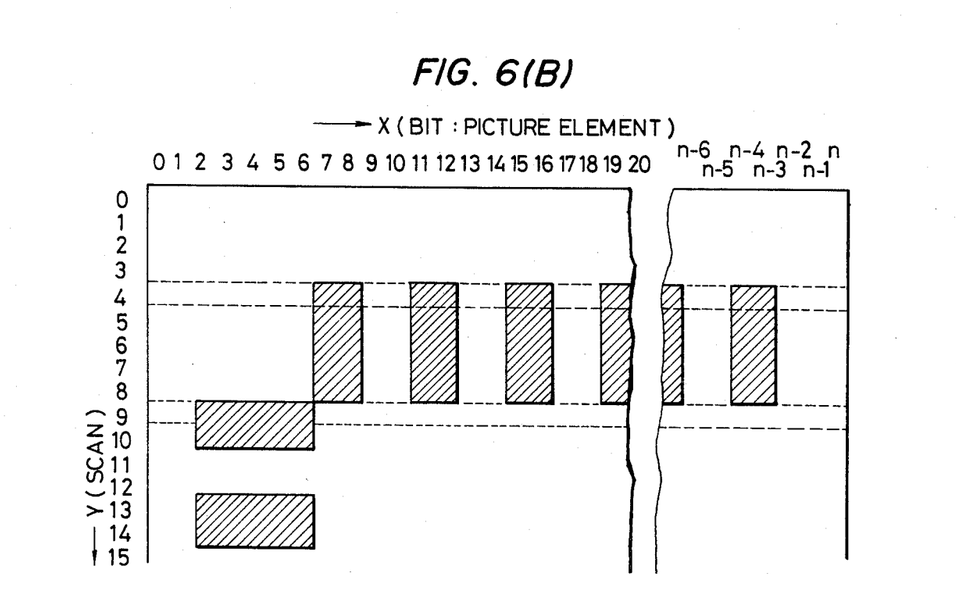
FIGS. 6B–6E are pattern diagrams and timing charts for use in explaining the operation of the device of FIG. 6A.
Figure 6C:
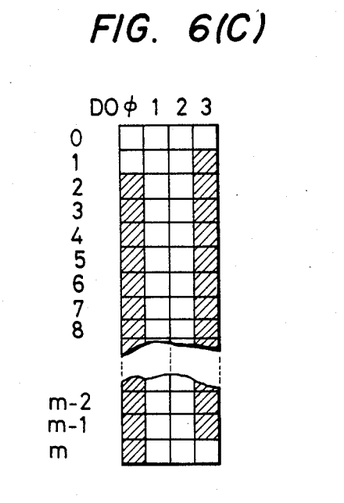
Figure 6D:
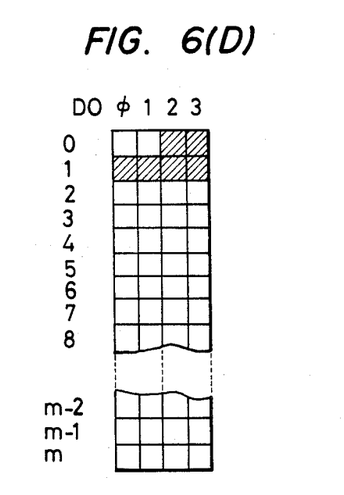

In order to obtain the output patterns as shown in FIG. 6B, the SEL-1 signal is made to be "1" for the 4th to the 8th scannings (Y-axis) and the SEL-2 signal is made to be "1" for the 9th to 10th scannings, 13th to 14th scannings, and so on. On the other hand, the ADX signal serves to select data out (DO) at b0 and b1 and thus data selection is repeatedly carried out from DO0 to DO3. From b2 to bn (X-axis), upon designating addresses, the contents of the designated address appear at DO0 to DO3. At the start of the operation, the ADX signal is outputted and the data are read out from the ROMs. During the first to third scannings, the output from an OR gate 202 is maintained at "0". At the fourth scanning, the SEL-1 signal becomes "1" and the contents of ROM 1 appear at the output terminal of the OR gate 202 in the order of DO0, DO1, DO2 and DO3. In the fifth scanning, similar to the fourth scanning, the contents of the ROM 1 appear at the output of the OR gate 202. The same is repeatedly carried out until the eighth scanning.

In the ninth and tenth scannings, the SEL-2 signal becomes "1" and then the contents of ROM 2 appear at the output of the OR gate 202. In the eleventh and twelfth scannings, both the SEL-1 and SEL-2 signals are "0" so that the output of the OR gate 202 is "0". In the thirteenth and fourteenth scannings, the contents of ROM 2 appear at the output of the OR gate 202 similar to the case in the ninth and tenth scannings. The above-described operations are repeatedly carried out until the page scanning is finished.

Figure 6E:
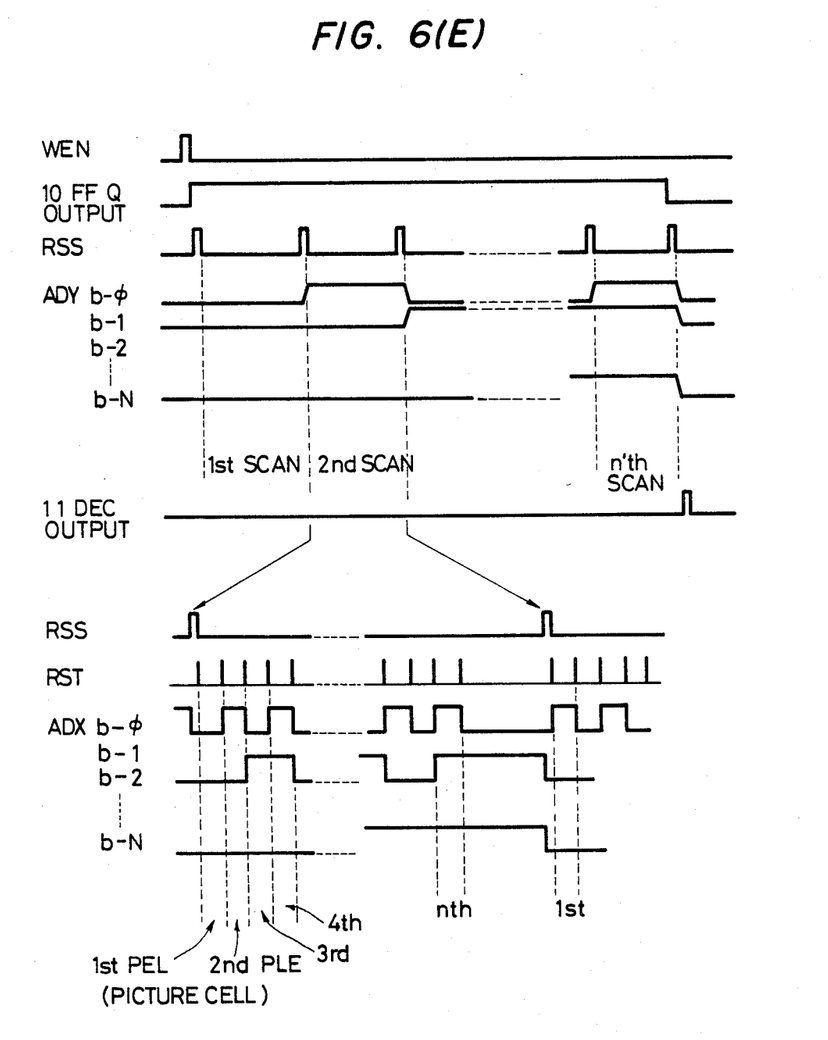

FIG. 6E is a timing chart for describing the foregoing operations.

In the above description, three kinds of output patterns are provided from the circuit shown in FIG. 6A, however, it is possible to increase the number of kinds of output patterns by adding further ROMs and by producing more than two outputs from the decoder 201.

Although the reproduced image with the reference pattern, which was obtained by the image outputting device according to this invention, is employed as the original in the foregoing embodiment, it is a matter of course that normal handwritten or printed documents and pictures not including any image formed of picture elements can be used as the input original.

In this case, it is evident that the memory in FIG. 1 is not necessarily required and hence may be omitted.

What is claimed is:

1. An image outputting device for outputting an image of an original containing a reference pattern comprising:
    means for reading each picture element of an original and for obtaining serial image signals of areas of said original other than the area containing said reference pattern, said reading being performed through main scanning and sub-scanning;
    pattern generation means for generating reference pattern signals at a timing in accordance with pre-arranged picture element positions on a scanning line corresponding to said reference pattern;
    means for producing combined image signals by combining said serial image signals with said reference pattern signals; and
    means for reproducing said combined image signals on a recording medium as a visible image including a reproduced reference pattern to thereby reproduce said original including said reference pattern on said recording medium and to enable subsequent reproduction from said recording medium.

2. An image outputting device as claimed in claim 1, further including memory means for temporarily storing said serial image signals.

3. An image outputting device as claimed in claim 1, said reading means initially scanning at a high scanning line density until said reference pattern is reached, and thereupon assuming a predetermined scanning pitch, whereby the phase of the read out picture elements is rendered coincident with that of the corresponding picture elements on said original.

4. An image outputting device as claimed in claims 1 or 3, further comprising means for temporary storage of said serial image signals and including a memory, and control means controlling reading from said memory, said combining means comprising gate means receiving image signals output via said control means, and an output of said pattern generating means.

5. An image outputting device as claimed in claim 4, said control means including means for inhibiting operation of said pattern generation means to prevent output of said reference pattern.

6. An image outputting device as claimed in claim 1, including memory means for storing said image signals, an output of said reading means lacking any signal corresponding to said reference pattern.

7. An image outputting device as claimed in claim 1, said reproducing means comprising a xerography device.

8. An image outputting device as claimed in claim 1, wherein said reference pattern signals comprise plural bit signals repeated for each scanning cycle and forming an image pattern arranged along both main and sub-scanning direction.

* * * * *